United States Patent
Li et al.

(10) Patent No.: US 8,285,252 B2
(45) Date of Patent: Oct. 9, 2012

(54) CHARGING METHOD, SYSTEM AND APPARATUS

(75) Inventors: Chun Li, Guangdong (CN); Mingjun Shan, Guangdong (CN); Jiao Kang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 303 days.

(21) Appl. No.: 12/632,688

(22) Filed: Dec. 7, 2009

(65) Prior Publication Data
US 2010/0081412 A1 Apr. 1, 2010

Related U.S. Application Data

(63) Continuation of application No. PCT/CN2008/071194, filed on Jun. 6, 2008.

(30) Foreign Application Priority Data

Jun. 8, 2007 (CN) .......................... 2007 1 0110926

(51) Int. Cl.
- *H04M 11/00* (2006.01)
- *H04W 4/00* (2009.01)
- *G06Q 40/00* (2012.01)
- *G06Q 20/00* (2012.01)

(52) U.S. Cl. ............. 455/406; 455/466; 705/40; 705/77
(58) Field of Classification Search .................. 455/406, 455/466; 705/40, 77
See application file for complete search history.

(56) References Cited

U.S. PATENT DOCUMENTS

| | | | |
|---|---|---|---|
| 6,141,550 A | | 10/2000 | Ayabe et al. |
| 2001/0041578 A1* | | 11/2001 | Na .................. 455/466 |
| 2003/0013467 A1* | | 1/2003 | Caloud .............. 455/466 |
| 2003/0058815 A1 | | 3/2003 | Shen et al. |
| 2003/0074286 A1* | | 4/2003 | Rodrigo ............ 705/32 |
| 2004/0198329 A1* | | 10/2004 | Vasa ............... 455/414.1 |
| 2009/0264097 A1* | | 10/2009 | Cai et al. .......... 455/406 |

FOREIGN PATENT DOCUMENTS

| | | |
|---|---|---|
| CN | 1298272 A | 6/2001 |
| CN | 1409564 A | 4/2003 |
| CN | 1889713 A | 1/2007 |
| EP | 1 439 675 A2 | 7/2004 |

(Continued)

OTHER PUBLICATIONS

"Successful MT Delivery Procedure in SMS-IP Architecture—S2-063640," 3GPP SA2 Meeting #55, Oct. 23-27, 2006, Busan, South Korea.

(Continued)

*Primary Examiner* — Ariel Balaoing
(74) *Attorney, Agent, or Firm* — Leydig, Voit & Mayer, Ltd.

(57) ABSTRACT

A charging method is disclosed according to one embodiment of the present disclosure. The method includes receiving a message transmission request carrying message content to be transmitted; generating a message conversion charging ID if the message content is to be converted; sending charging information carrying the message conversion charging ID and performing charging control on the message sender based on the message conversion charging ID. A charging system and apparatus are also disclosed according to embodiments of the present disclosure. With the present disclosure, the charging of message service becomes more flexible and the user experience is improved.

9 Claims, 9 Drawing Sheets

FOREIGN PATENT DOCUMENTS

WO    97/23082 A1    6/1997

OTHER PUBLICATIONS

Extended European Search Report in corresponding European Patent Application No. 087576053.4 (Sep. 30, 2010).
Written Opinion of the International Searching Authority in corresponding PCT Application No. PCT/CN2008/071194 (Aug. 28, 2008).
International Search Report in corresponding PCT Application No. PCT/CN2008/071194 (Aug. 28, 2008).
$1^{st}$ Office Action in corresponding Chinese Application No. 200710110926.6 (Jun. 29, 2011).
Intellectual Property Office of the People'S Republic of China, Rejection Decision in corresponding Chinese Application No. 200710110926.6 (Apr. 17, 2012).

* cited by examiner

CHARGING METHOD, SYSTEM AND APPARATUS

CROSS-REFERENCE TO RELATED APPLICATIONS

This application is a continuation of International Application No. PCT/CN2008/071194, filed on Jun. 6, 2008, which claims priority to Chinese Patent Application No. 200710110926.6, filed on Jun. 8, 2007, both of which are hereby incorporated by reference in their entireties.

FIELD OF THE INVENTION

The present disclosure relates to communication network field, and more specifically, to charging technique.

BACKGROUND

Short Message Service (SMS) is a service in Global System for Mobile Communications (GSM)/Universal Mobile Telecommunications System (UMTS) which does not require creating end-to-end service paths. A mobile station is able to transmit short messages under all-circuit communication situation. Generally, a short message communication involves only one message. That is, a transmission of one message represents one communication. Therefore, the SMS is an asymmetric service including a Short Message-Mobile Originated (SM-MO) transmission and a Short Message-Mobile Terminated (SM-MT) transmission. The transmission of the short message relies on a Short Message Service Center (SMSC) external to the GSM/UMTS relaying the message.

FIG. 1 illustrates a conventional system architecture for transmitting short messages where the system supports Internet Protocol (IP). This system architecture is directed to implement SMS by employing a protocol supported by user equipment (UE). For instance, the system may be an IP Multimedia Subsystem (IMS). In this architecture, IP Short Message Gateway (IP-SM-GW) may interact with existing elements such as Gateway Mobile Switching Center For Short Message Service (SMS-GMSC)/Interworking Mobile Switching Center For Short Message Service (SMS-IWMSC), SMSC, Home Location Register/Home Subscriber Server (HLR/HSS). With the improvement of the capability of the mobile station, mobile station, especially IMS based Session Initiation Protocol (SIP) terminal, is able to receive and transmit short messages in various formats. For instance, the mobile station may be able to receive and transmit textual, audio, animated or graphical short messages. Generally, the lengths of these short messages are long. In order to be compatible with the existing short messaging system, IP-SM-GW may split or combine these short messages.

FIG. 2 illustrates a conventional architecture of on-line charging for short messages. In this architecture, before the user who has pre-paid the fee for the short messages sends or receives a short message, the SMSC is responsible for interacting with an Online Charging System (OCS) or an intelligent network system so as to handle the authentication request from the user who has pre-paid the fee and handle the fee deduction operation. However, the conventional online charging for short message has the following disadvantages. When the user uses an IMS based terminal to send a short message, since a Session Initiation Protocol (SIP) message is able to carry a considerable length of content for the short message, the IP-SM-GW may convert the SIP message carrying short message content with a considerable length into multiple normal short messages in accordance with the restriction on the length of normal short message. However, according to the existing charging scheme, the charging system will charge the converted multiple short messages by different charging standards. Apparently, this is unfair to the user and thus the user is less satisfied.

SUMMARY

The problem to be solved by embodiments of the present disclosure is to provide a charging method, a communication system, a charging system and a charging apparatus so as to enhance the flexibility in charging messaging service and to improve user experience.

To this end, the technical solutions provided by embodiments of the present disclosure include the following.

A charging method includes: (1) receiving a message transmission request from a message sender, wherein the message transmission request carries message content to be transmitted; (2) generating a message conversion charging ID if the message content is to be converted; and (3) sending charging information carrying the message conversion charging ID and performing charging control on the message sender based on the message conversion charging ID.

A communication system includes: (1) a message converting gateway, configured to convert message content carried in a message transmission request initiated by a message sender, generate a message conversion charging ID, and send charging information carrying the message conversion charging ID to a charging system; and (2) the charging system, configured to perform charging control on the message sender based on the message conversion charging ID.

A charging system includes: (1) a receiving unit, configured to receive charging information which is used to charge for messages sent by a message sender, wherein the charging information carries a message conversion charging ID generated from the conversion of the message content to be transmitted; and (2) a charging processing unit, configured to perform charging on the message sender based on the message conversion charging ID.

A message converting gateway includes: (1) a message receiving unit, configured to receive a message transmission request which carries message content to be transmitted; (2) a content conversion unit, configured to convert the message content and generate a message conversion charging ID; and (3) an accounting request sending unit, configured to send charging information carrying the message conversion charging ID and perform charging control on a sender of the message sender based on the message conversion charging ID.

As can be seen from the foregoing technical solutions, in the embodiments of the present disclosure, when the message converting gateway receives a message transmission request from a message sender, the message converting gateway may convert the message content and generates a message conversion charging ID based on the message transmission request. The charging system is able to perform association charging on the multiple short messages converted from the message content and thus enhance the flexibility in charging messaging service and improve user experience.

DETAILED DESCRIPTION

The purposes, technical solutions and advantages concerning the embodiments of the present disclosure will become more readily appreciated by reference to the following description of the embodiments, when taken in conjunction with the accompanying drawings. Specifically, the present disclosure takes short messages as an example for illustration. For those skilled in the art, the technical solutions of the present disclosure can be applied to, but not limited to, short message service, and other messaging service such as multimedia message service, converged IP message service.

Figure 1:
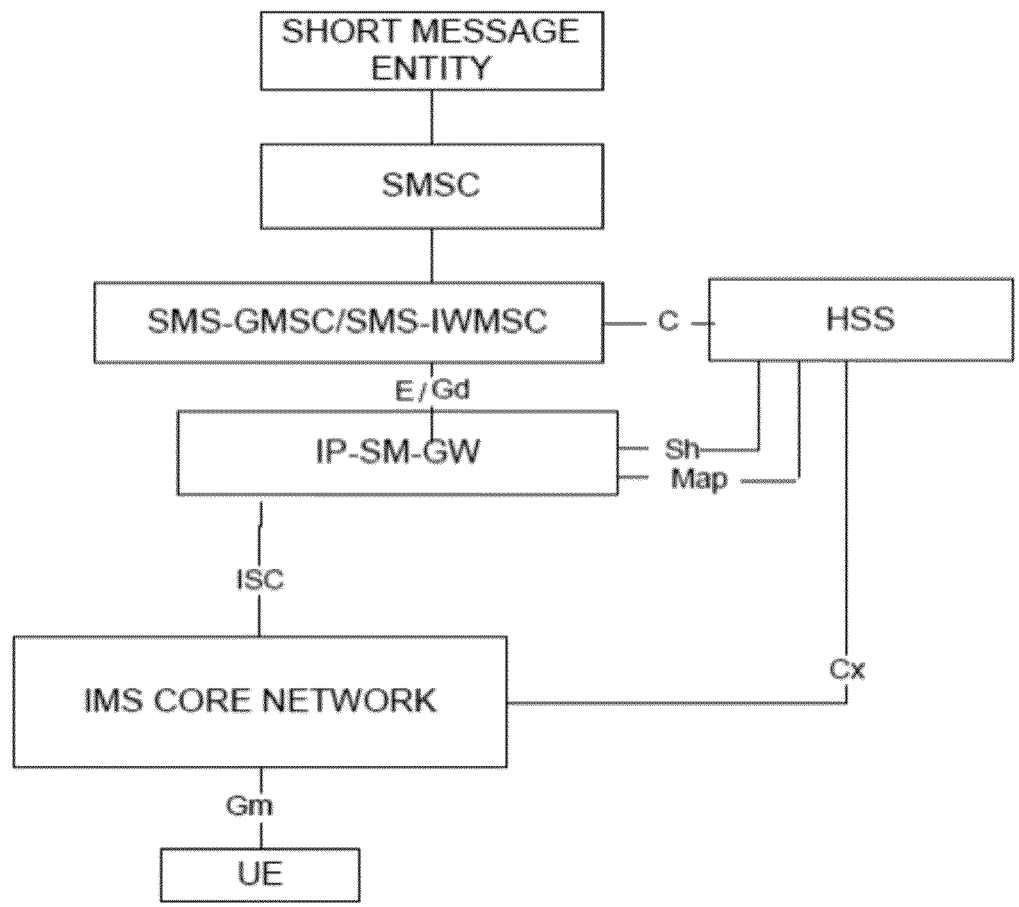
FIG. 1 is a conventional IP supporting architecture for transmitting and forwarding short messages.
Figure 2:
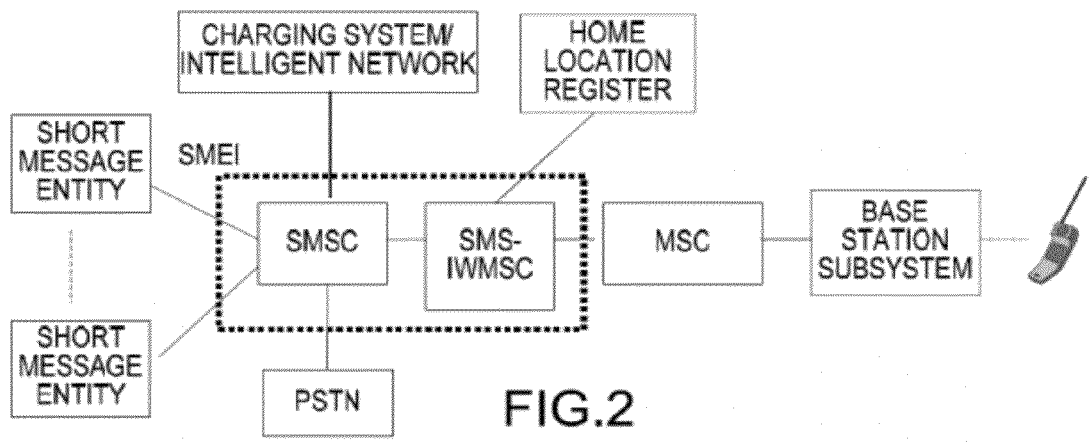
FIG. 2 illustrates a conventional architecture of on-line charging for short messages.
Figure 3:
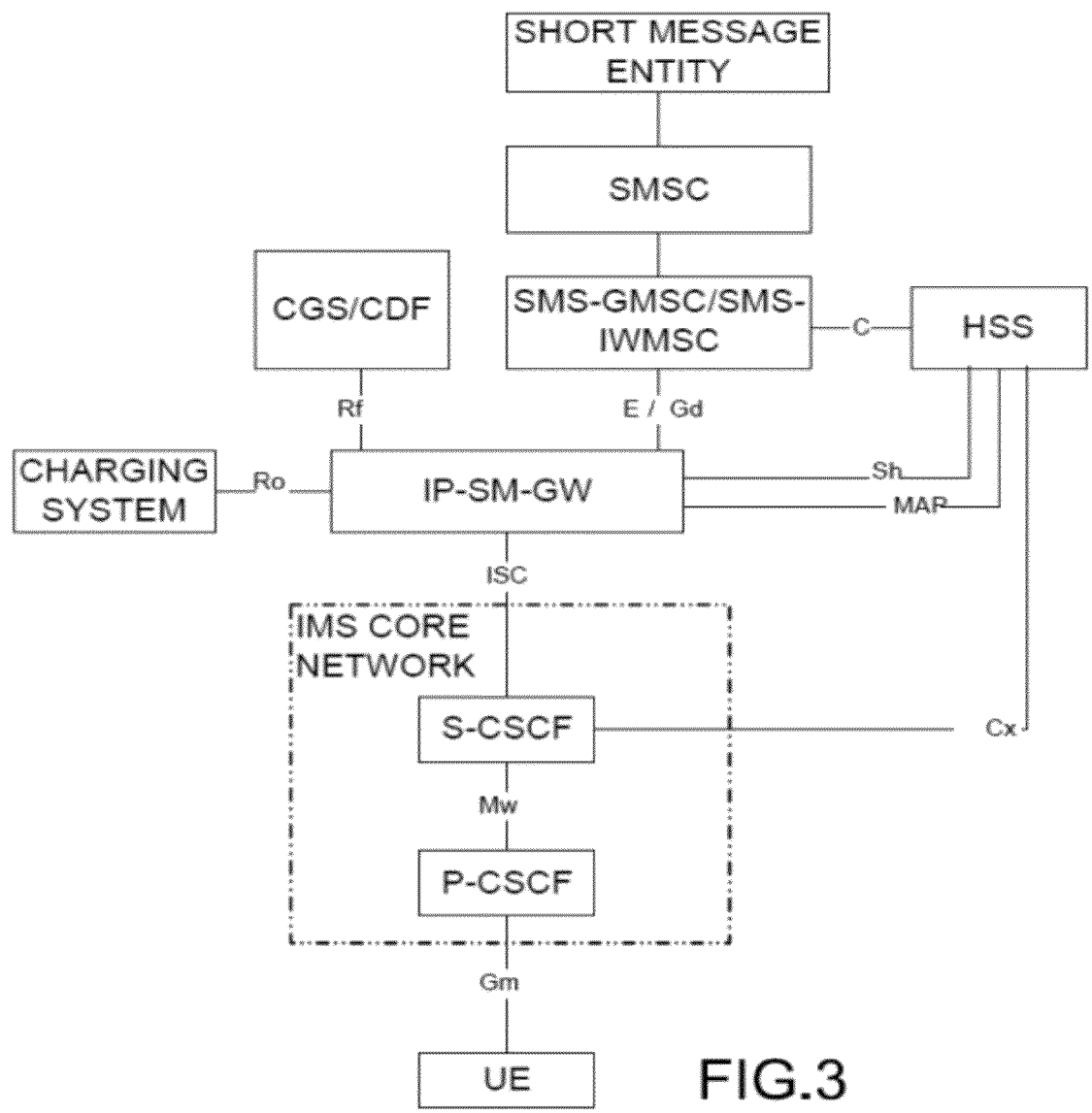
FIG. 3 is an IP supporting architecture for transmitting and forwarding short messages and charging for short messages according to one embodiment of the present disclosure, where the architecture supports IP.

FIG. 3 is an IP supporting architecture for transmitting and forwarding short messages according to one embodiment of the present disclosure. As illustrated in FIG. 3, Online Charging System (OCS) interacts with IP-SM-GW via an online charging interface Ro so as to realize the online charging control over the short messages associated with IMS UE. The IP-SM-GW sends offline charging information to the counting gateway function/counting data function (CGS/CDF) via Rf interface to carry out offline charging.

In one embodiment of the present disclosure, for IP-SM-GW based SMS, the IMS UE may encapsulate the actual message content in the message body of an SIP signaling and forward the signaling to the IP-SM-GW. The IP-SM-GW resolves the SIP signaling, extracts actual message content, converts the actual message content to an existing short message protocol and transmits to the short message service center. In the actual conversion process, the message might need to be converted to multiple normal short messages if the message content is huge. For the user, these short messages belong to the same short message content. Two different solutions can be utilized to solve this issue.

1. The charging system charges for these short messages once for all and the length of complete message content and the number of short messages after the message content is converted are carried in an accounting request message.

2. Accounting requests are reported respectively with respect to multiple converted short messages. These accounting requests contain application association IDs for these converted short messages, which are used to perform association charging on these messages in the charging system.

Detailed description will be made to the present disclosure in conjunction with the specific embodiments.

Figure 4:
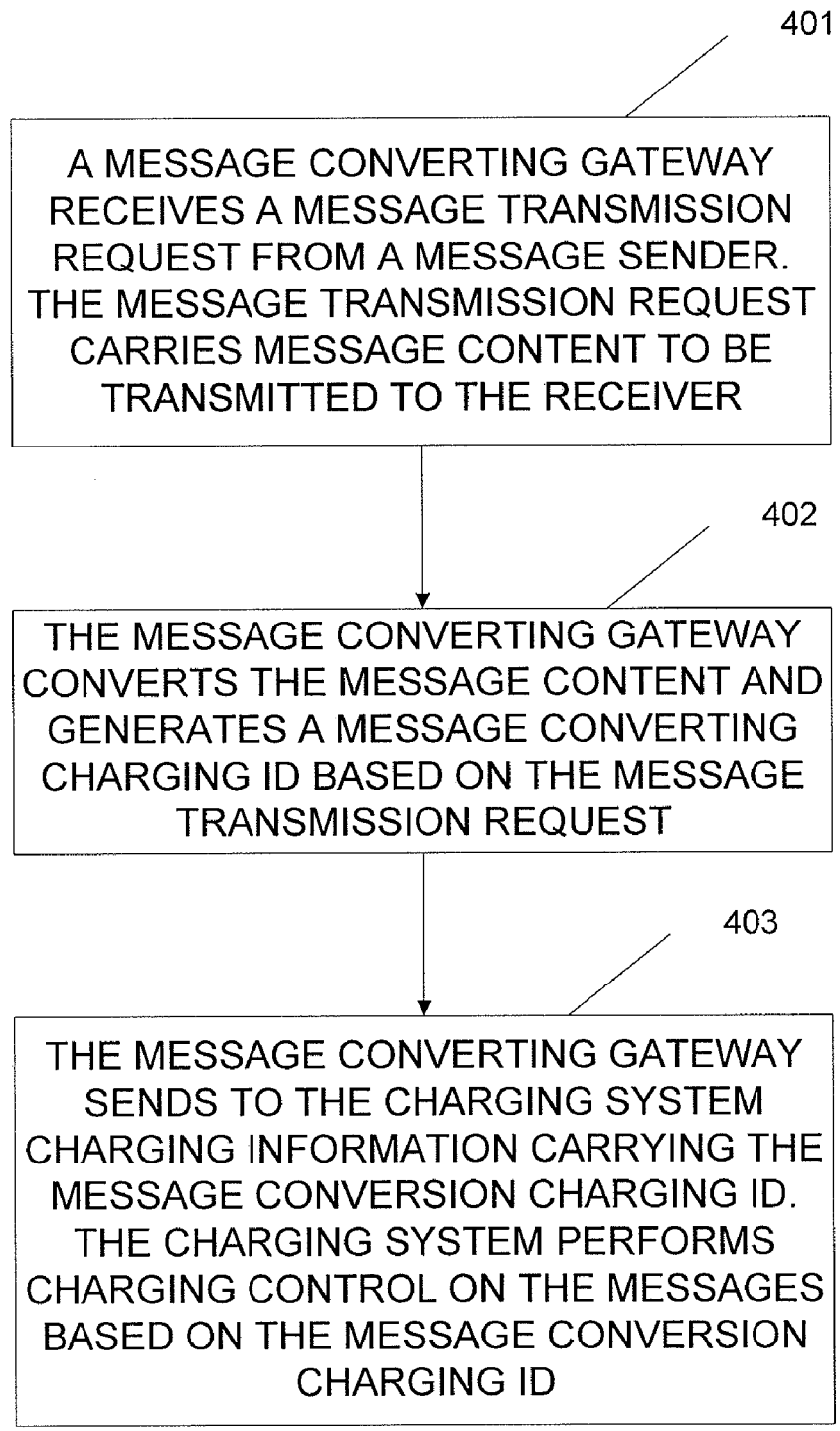
FIG. 4 illustrates a flowchart of a charging method according to one embodiment of the present disclosure.

FIG. 4 illustrates a flowchart of a charging method according to one embodiment of the present disclosure;

As illustrated in FIG. 4, the method includes the following blocks.

Block 401: The message converting gateway receives a message transmission request from a message sender. The message transmission request carries message content to be transmitted to the receiver.

Block 402: The message converting gateway converts the message content and generates a message conversion charging ID based on the message transmission request.

Block 403: The message converting gateway sends charging information carrying the message conversion charging ID to the charging system. The charging system performs charging control over the message based on the message conversion charging ID.

The embodiment of the present disclosure can be applied to online charging or to offline charging. Each exemplary embodiment of the present disclosure will be discussed in detail below.

First Embodiment

In the first embodiment, after the message content of the SIP message is converted into multiple short messages, these short messages are charged offline as a whole.

The SIP message may be initiated by IMS UE or application server (AS).

Figure 5:
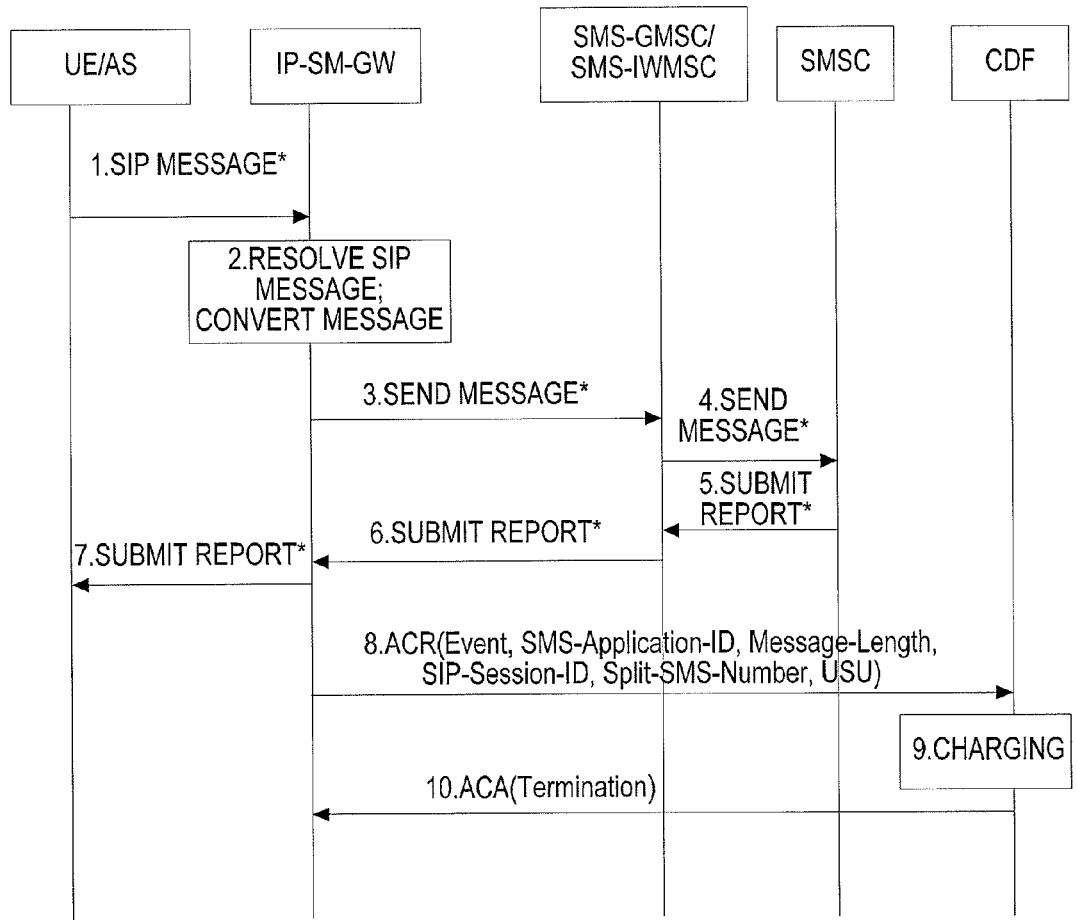
FIG. 5 illustrates an exemplary flowchart of a method for charging short messages according to a first embodiment of the present disclosure.

FIG. 5 illustrates a flowchart of offline charging for multiple short messages as a whole according to the first embodiment in which these multiple short messages are converted from the message content of SIP message initiated by the IMS UE or AS.

As illustrated in FIG. 5, the method includes the following blocks.

Block 1: IMS UE or AS transmits an SIP message carrying message content to the IP-SM-GW.

Below is one example of SIP message.

```
Message sip:TBD@TBD.net SIP/2.0
Via: SIP/2.0/UDP [5555::aaa:bbb:ccc:ddd]:1357;comp=sigcomp;
    branch=z9hG4bKnashds7
Max-Forwards: 70
Route: <sip:pcscf1.visited1.net:7531; lr;comp=sigcomp>,
    <sip:orig@scscf1.home1.net;lr>
P-Preferred-Identity: "John Doe" <sip:user1_public1@home1.net>
From: <sip:user1_public1@home1.net>; tag=171828
To: <sip:TBD@TBD.net>
Call-ID: cb03a0s09a2sdfglkj490333
Cseq: 666 Message
Content-Type: application/vnd.3gpp.sms
Content-Length: (a quite long text)
```

Block 2: The IP-SM-GW resolves the received SIP message and converts the message content of the SIP message into multiple normal short messages in accordance with the policy of the operator, the restriction on the short message protocol or the restriction on the network bearer capability.

Block 3: The IP-SM-GW forwards the converted short messages to the SMS-GMSC/IWMSC in accordance with an existing short message protocol.

Block 4: The SMS-GMSC/IWMSC forwards the converted short messages to SC.

Block 5: The SC forwards successful submit reports to the SMS-GMSC/IWMSC.

Block 6: The SMS-GMSC/IWMSC forwards successful submit reports to the IP-SM-GW.

Block 7: The IP-SM-GW forwards successful submit reports to the UE/AS.

Block 3 to Block 7 can be repeated for several times depending on the number of the converted short messages.

Block 8: When all the converted multiple short messages are sent out, the IP-SM-GW sends an offline accounting request (offline ACR) to an offline charging system (e.g., CDF).

In the present embodiment, the IP-SM-GW takes the complete message as the basis for offline charging. In the ACR message sent by the IP-SM-GW to the CDF, the following information is added in the SMS-Information definition: Message-Length indicates the length of the complete message content prior to conversion. Split-SMS-Number indicates the number of short messages after conversion. SMS-Application-Id indicates that several converted short messages belong to the same service application, such as weather forecast service, advertizing service, etc. Sip-Session-Id indicates that several converted messages are converted from the message content of the same SIP message.

```
SMS-Information:: =    < AVP Header: XXX>
                                        [ Message-Length ]
<!--this parameter originates from Content-Length of the message content
contained in the SIP message initiated by the IMS UE.-->
                                        [ Split-SMS-Number ]
<!--this parameter originates from the number of short messages converted
from the message content in accordance with the policy of the operator,
the restriction on the short message protocol or the restriction on the
network bearer capability.-->
                                        [ SMS-Application-Id ]
<!--this parameter may originate from a parameter Content-Type carried
in the SIP message.-->
                                        [ Sip-Session-Id ]
<!--this parameter may originate from the value of Call-Id in the SIP
message or the value which can uniquely identify the current SIP message
session.-->
```

Block 9: The CDF processes the ACR.
Block 10: The CDF returns an accounting answer (ACA) to the IP-SM-GW.

Second Embodiment

In the second embodiment, after the SIP message initiated by the IMS UE or AS is converted, offline accounting request is sent for several times based on the number of converted short messages so as to carry out offline charging.

Figure 6:
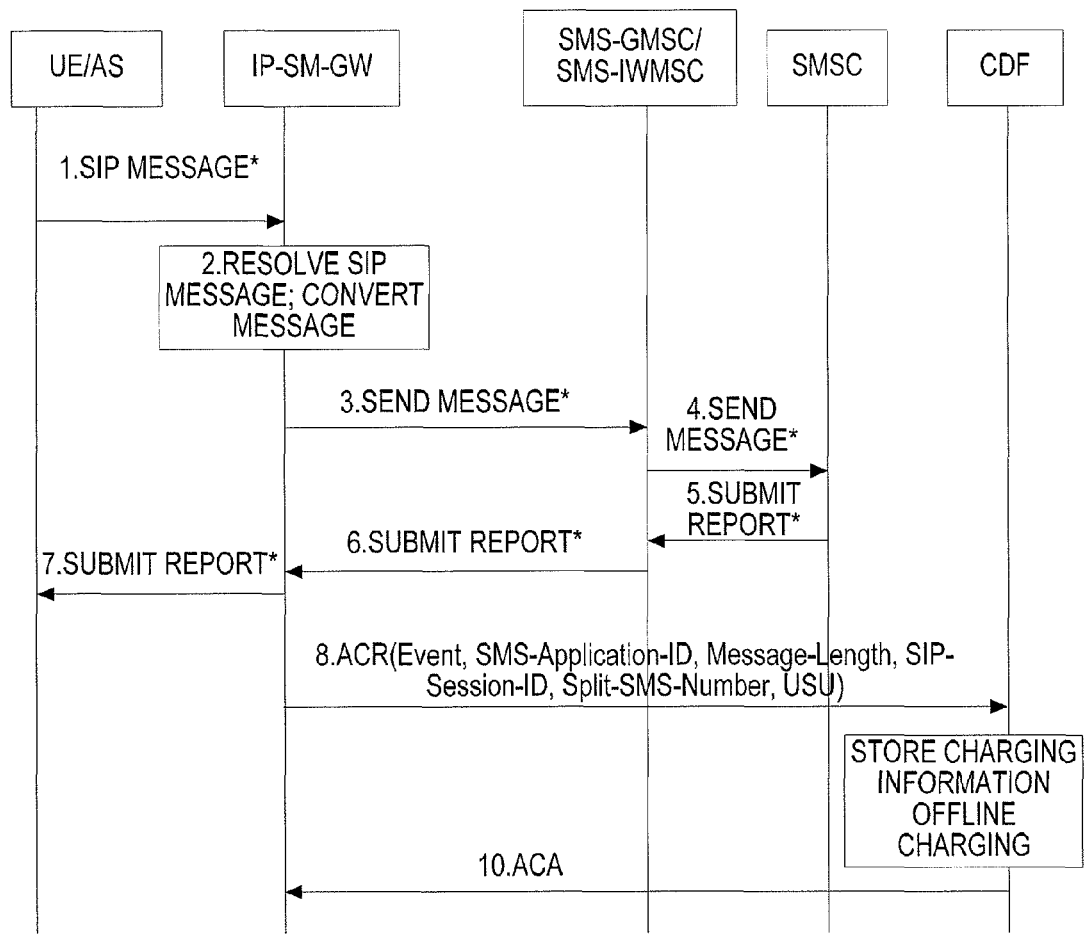
FIG. 6 illustrates an exemplary flowchart of a method for charging short messages according to a second embodiment of the present disclosure.

FIG. 6 illustrates a flowchart of offline charging based on the number of short messages converted from the SIP message initiated by the IMS UE or AS.

As illustrated in FIG. 6, the method includes the following blocks.

Block 1: The IMS UE or AS transmits an SIP message carrying message content to the IP-SM-GW.

Block 2: The IP-SM-GW resolves the received SIP message and converts the message content into multiple normal short messages in accordance with the policy of the operator, the restriction on the short message protocol or the restriction on the network bearer capability.

Block 3: The IP-SM-GW forwards the converted short messages to the SMS-GMSC/IWMSC in accordance with an existing short message protocol.

Block 4: The SMS-GMSC/IWMSC forwards the converted multiple short messages to the SC.

Block 5: The SC forwards successful submit reports for multiple short messages to the SMS-GMSC/IWMSC.

Block 6: The SMS-GMSC/IWMSC forwards the successful submit reports to the IP-SM-GW.

Block 7: The IP-SM-GW forwards successful submit reports to the UE/AS.

Block 8: The IP-SM-GW sends offline ACR to the CDF.

In this block, the IP-SM-GW sends an offline ACR to the offline charging system after one converted short message is transmitted. In the ACR message sent by the IP-SM-GW to the CDF, the following information is added in the SMS-Information definition: Message-Length indicates the length of the complete message content prior to conversion. Split-SMS-Number indicates the number of short messages after conversion. SMS-Application-Id indicates that several converted short messages belong to the same service application, such as weather forecast service, advertizing service, etc. Sip-Session-Id indicates that several converted messages are converted from the message content of the same SIP message.

```
SMS-Information:: =    < AVP Header: XXX>
                                        [ Message-Length ]
<!--this parameter originates from Content-Length of the message content
contained in the SIP message initiated by the IMS UE.-->
                                        [ Split-SMS-Number ]
<!--this parameter originates from the number of short messages converted
from the message content in accordance with the policy of the operator,
the restriction on the short message protocol or the restriction on the
network bearer capability.-->
                                        [ SMS-Application-Id ]
<!--this parameter may originate from a parameter Content-Type carried
in the SIP message.-->
                                        [ Sip-Session-Id ]
<!--this parameter may originate from the value of Call-Id in the SIP
message or the value which can uniquely identify the current SIP message
session.-->
```

Block 9: The offline charging system processes the ACR.
Block 10: The CDF returns an accounting answer (ACA) to the IP-SM-GW.

Block 3 to Block 10 can be repeated for several times depending on the number of the short messages converted.

After the charging system receives the offline accounting requests for all the short messages, the charging system performs charging control. Association charging is performed on these short messages as a whole based on SMS-Application-Id and SIP-Session-Id.

Third Embodiment

In the third embodiment, after the message content of the SIP message initiated by the IMS UE or AS is converted into multiple short messages, these short messages as a whole are charged online.

Figure 7:
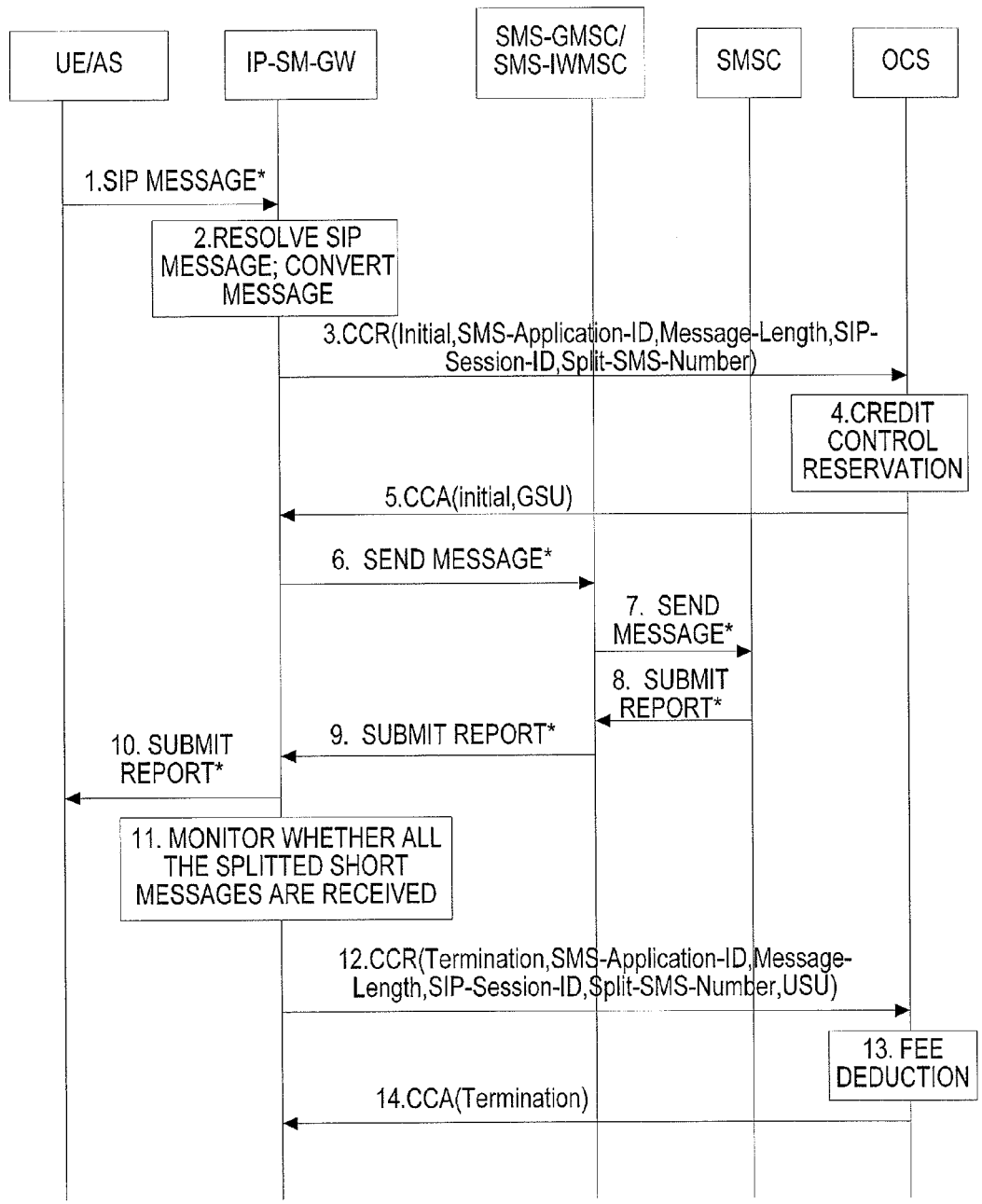
FIG. 7 illustrates an exemplary flowchart of a method for charging short messages according to a third embodiment of the present disclosure.

FIG. 7 illustrates a flowchart of online charging for multiple short messages as a whole according to the third embodiment in which these multiple short messages are converted from the message content of SIP message initiated by the IMS UE or AS.

As illustrated in FIG. 7, the method includes the following blocks.

Block 1: The IMS UE or AS transmits an SIP message carrying message content to the IP-SM-GW.

Below is one example of SIP message.

```
Message sip:TBD@TBD.net SIP/2.0
Via: SIP/2.0/UDP [5555::aaa:bbb:ccc:ddd]:1357;comp=sigcomp;
    branch=z9hG4bKnashds7
Max-Forwards: 70
```

-continued

```
Route: <sip:pcscf1.visited1.net:7531; lr;comp=sigcomp>,
<sip:orig@scscf1.home1.net;lr>
P-Preferred-Identity: "John Doe" <sip:user1_public1@home1.net>
From: <sip:user1_public1@home1.net>; tag=171828
To: <sip:TBD@TBD.net>
Call-ID: cb03a0s09a2sdfglkj490333
Cseq: 666 Message
Content-Type: application/vnd.3gpp.sms
Content-Length: (a quite long text)
```

Block 2: The IP-SM-GW resolves the received SIP message and converts the message content into multiple normal short messages in accordance with the policy of the operator, the restriction on the short message protocol or the restriction on the network bearer capability.

Block 3: The IP-SM-GW sends an online ACR, such as credit control request (CCR), to OCS.

In this block, the IP-SM-GW reserves the complete SIP message as a whole. In the CCR message sent by the IP-SM-GW to the OCS, the following information is added in the SMS-Information definition: Message-Length indicates the length of the complete message content prior to conversion. Split-SMS-Number indicates the number of short messages after conversion. SMS-Application-Id indicates that several converted short messages belong to the same application. Sip-Session-Id indicates that several converted messages are converted from the message content of the same SIP message.

```
SMS-Information:: =    < AVP Header: XXX>
                                        [ Message-Length ]
<!--this parameter originates from Content-Length of the message content
contained in the SIP message initiated by the IMS UE.-->
                                        [ Split-SMS-Number ]
<!--this parameter originates from the number of short messages converted
from the message content in accordance with the policy of the operator,
the restriction on the short message protocol or the restriction on the
network bearer capability.-->
                                        [ SMS-Application-Id ]
<!--this parameter may originate from a parameter Content-Type carried
in the SIP message.-->
                                        [ Sip-Session-Id ]
<!--this parameter may originate from the value of Call-Id in the SIP
message or the value which can uniquely identify the current SIP
message session.-->
```

Block 4: The OCS performs credit control reservation on the current transmission of the message content based on Message-Length, Split-SMS-Number, SMS-Application-Id, Sip-Session-Id.

Block 5: The OCS returns a CCR answer such as Credit Control Answer (CCA) to the SIP-SM-GW.

Block 6: The IP-SM-GW forwards the converted short messages to the SMS-GMSC/IWMSC.

Block 7: The SMS-GMSC/IWMSC forwards the short messages to the SC.

Block 8: The SC forwards successful submit reports to the SMS-GMSC/IWMSC.

Block 9: The SMS-GMSC/IWMSC forwards the successful submit reports to the IP-SM-GW.

Block 10: The IP-SM-GW forwards the successful submit reports to the UE/AS.

Block 6 to Block 10 can be repeated for several times depending on the number of the short messages converted.

Block 11: The IP-SM-GM monitors if the successful submit reports for all the short messages are received.

Block 12: When all the converted short messages are sent out, the IP-SM-GW sends an online accounting request (CCR) to the OCS.

Block 13: The OCS processes the CCR and performs fee deduction.

Block 14: The OCS returns a CCA answer to the IP-SM-GW.

Fourth Embodiment

In the fourth embodiment, after the message content of the SIP message initiated by IMS UE or AS is converted into multiple short messages, these short messages are charged online, respectively.

Figure 8:
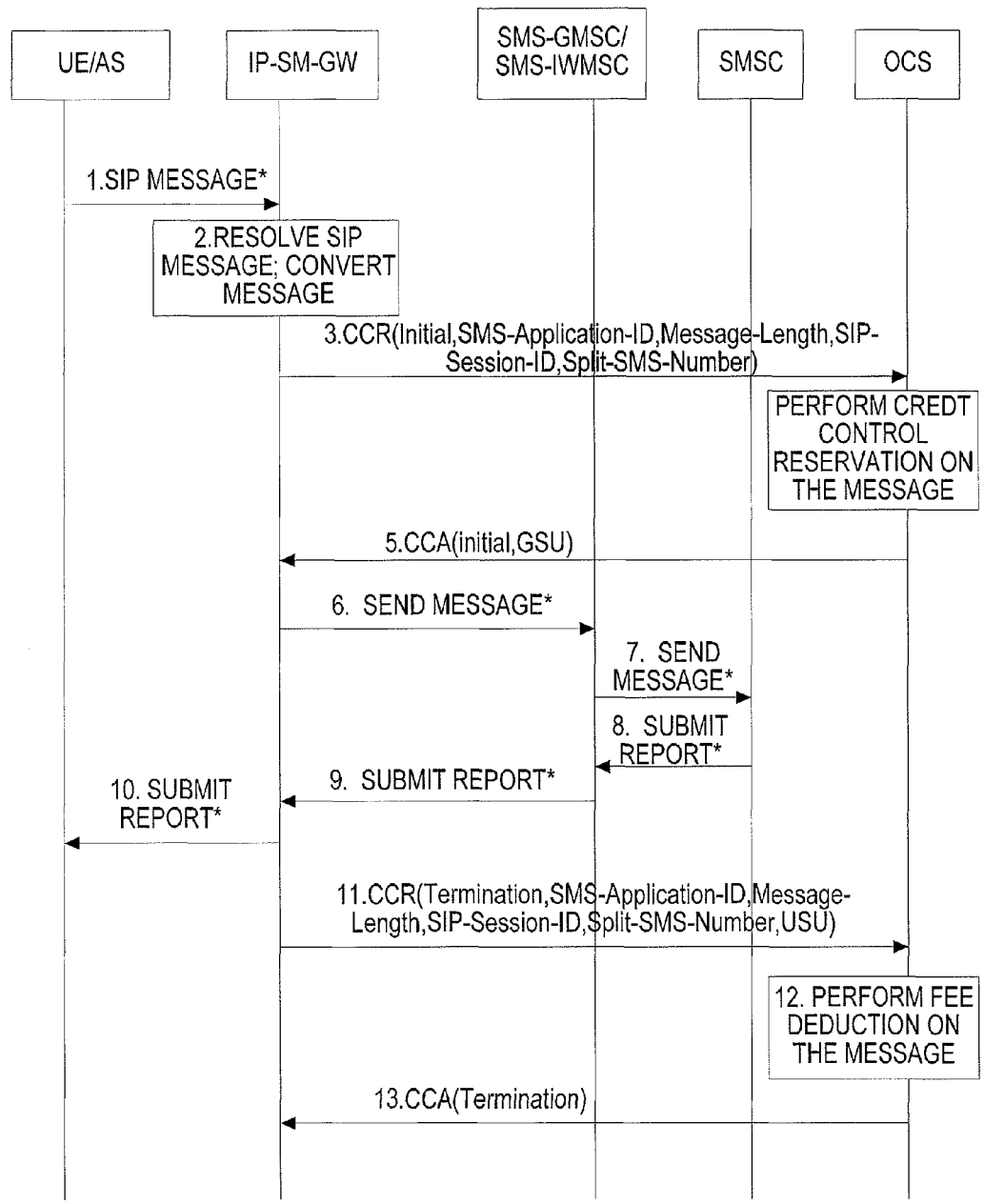
FIG. 8 illustrates an exemplary flowchart of a method for charging short messages according to a fourth embodiment of the present disclosure.

FIG. 8 illustrates a flowchart of online charging for the converted short messages respectively according to the fourth embodiment in which these short messages are converted from the message content of SIP message initiated by the IMS UE or AS.

As illustrated in FIG. 8, the method includes the following blocks.

Block 1: The IMS UE or AS transmits an SIP message carrying message content to the IP-SM-GW.

Below is one example of SIP message.

```
Message sip:TBD@TBD.net SIP/2.0
Via: SIP/2.0/UDP [5555::aaa:bbb:ccc:ddd]:1357;comp=sigcomp;
    branch=z9hG4bKnashds7
Max-Forwards: 70
Route: <sip:pcscf1.visited1.net:7531; lr;comp=sigcomp>,
<sip:orig@scscf1.home1.net;lr>
P-Preferred-Identity: "John Doe" <sip:user1_public1@home1.net>
From: <sip:user1_public1@home1.net>; tag=171828
To: <sip:TBD@TBD.net>
Call-ID: cb03a0s09a2sdfglkj490333
Cseq: 666 Message
Content-Type: application/vnd.3gpp.sms
Content-Length: (a quite long text)
```

Block 2: The IP-SM-GW resolves the received SIP message and converts the message content into multiple normal short messages in accordance with the policy of the operator, the restriction on the short message protocol or the restriction on the network bearer capability.

Block 3: The IP-SM-GW sends an online accounting request (CCR) to the OCS. In this block, the IP-SM-GW performs online charging credit control reservation on single short message. In the CCR message sent by the IP-SM-GW to the OCS, the following information is added in the SMS-Information definition: Message-Length indicates the length of the complete message content prior to conversion. Split-SMS-Number indicates the number of short messages after conversion. SMS-Application-Id indicates that several converted short messages belong to the same application. Sip-Session-Id indicates that several converted messages are converted from the message content of the same SIP message.

```
SMS-Information:: =    < AVP Header: XXX>
                                        [ Message-Length ]
<!--this parameter originates from Content-Length of the message content
contained in the SIP message initiated by the IMS UE.-->
                                        [ Split-SMS-Number ]
<!--this parameter originates from the number of short messages converted
from the message content in accordance with the policy of the operator,
the restriction on the short message protocol or the restriction on the
network bearer capability.-->
                                        [ SMS-Application-Id ]
```

```
<!--this parameter may originate from a parameter Content-Type carried
in the SIP message.-->
         [ Sip-Session-Id ]
<!--this parameter may originate from the value of Call-Id in the SIP
message or the value which can uniquely identify the current SIP
message session.-->
```

Block 4: The OCS performs credit reservation on the single short message based on Message-Length, Split-SMS-Number, SMS-Application-Id, Sip-Session-Id.

Block 5: The OCS returns a CCA answer to SIP-SM-GW.

Block 6: The IP-SM-GW forwards the one converted short message to the SMS-GMSC/IWMSC.

Block 7: The SMS-GMSC/IWMSC forwards one short message to SC.

Block 8: The SC forwards a successful submit report to the SMS-GMSC/IWMSC.

Block 9: The SMS-GMSC/IWMSC forwards a successful submit report to the IP-SM-GW.

Block 10: The IP-SM-GW forwards the successful submit report to the UE/AS.

Block 11: When the current short message is transmitted successfully, the IP-SM-GW sends an online accounting request (CCR) to the OCS.

Block 12: The OCS processes the CCR and performs fee deduction on the current short message.

Block 13: The OCS returns a CCA answer to the IP-SM-GW.

Block 6 to Block 13 can be repeated for several times depending on the number of the short messages converted.

Based on the foregoing description, a charging system is further disclosed according to one embodiment of the present disclosure. The system includes a receiving unit, an obtaining unit and a charging processing unit. The receiving unit is configured to receive charging information from a message converting gateway. The charging information carries message conversion charging ID. The obtaining unit is configured to obtain the message conversion charging ID. The charging processing unit is configured to perform charging based on the message conversion charging ID. In one embodiment of the present disclosure, the message conversion charging ID contained in the charging information may include, but not limited to, SMS-Application-Id and Sip-Session-Id. In other embodiments of the present disclosure, the message conversion charging ID may include, but not limited to, the above mentioned SMS-Application-Id, Sip-Session-Id, Message-Length and Split-SMS-Number.

A communication system is also disclosed according to one embodiment of the present disclosure.

The communication system includes a message sender, a message converting gateway and a charging system.

The message sender initiates a message transmission request to the message converting gateway. The message transmission request carries message content to be transmitted to a receiver. The message converting gateway is configured to convert the message content and generate a message conversion charging ID based on the message transmission request and send charging information carrying the message conversion charging ID to the charging system. The charging system is configured to control the charging over the messages based on the message conversion charging ID.

Figure 9:
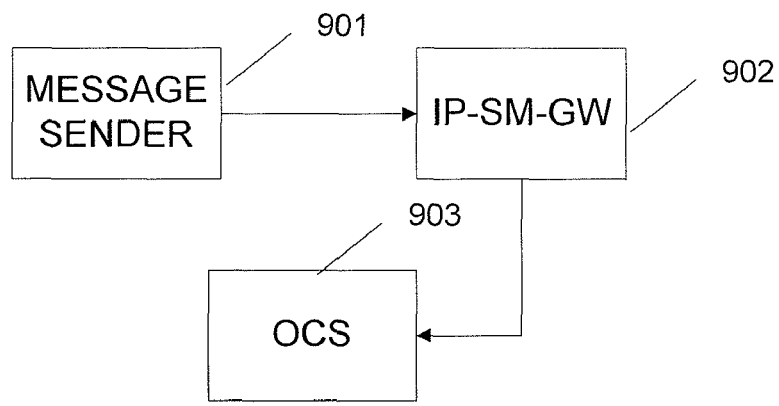
FIG. 9 is an exemplary diagram of a communication system according to one embodiment of the present disclosure.

The communication system according to the present disclosure can be applied to online charging or to offline charging. For instance, the communication system according to the embodiments of the present disclosure can be applied to online charging. FIG. 9 is block diagram of a communication system according to one embodiment of the present disclosure.

As illustrated in FIG. 9, the communication system may include a message sender 901, an IP-SM-GW 902, and an OCS 903.

The message sender 901 is configured to transmit an SIP message carrying message content to the IP-SM-GW 902.

The IP-SM-GW 902 is configured to convert the message content to at least two short messages and send online accounting requests carrying message conversion charging ID to the OCS 903.

The OCS 903 is configured to extract the message conversion charging ID from the online accounting message and perform charging control over the message based on the message conversion charging ID.

Specifically, the OCS 903 is configured to perform resource quota reservation based on the length of the message content, the number of the converted short messages and other message conversion charging ID, and configured to return an online accounting answer to the IP-SM-GW 902.

The IP-SM-GW 902 is configured to send the SIP message carrying the message content to the receiver 901 after receiving the online accounting answer.

The IP-SM-GW 902 is further configured to send a charging termination request CCR to the OCS 903 after receiving the answer from the receiver and is further configured to perform fee deduction based on the CCR.

Figure 10:
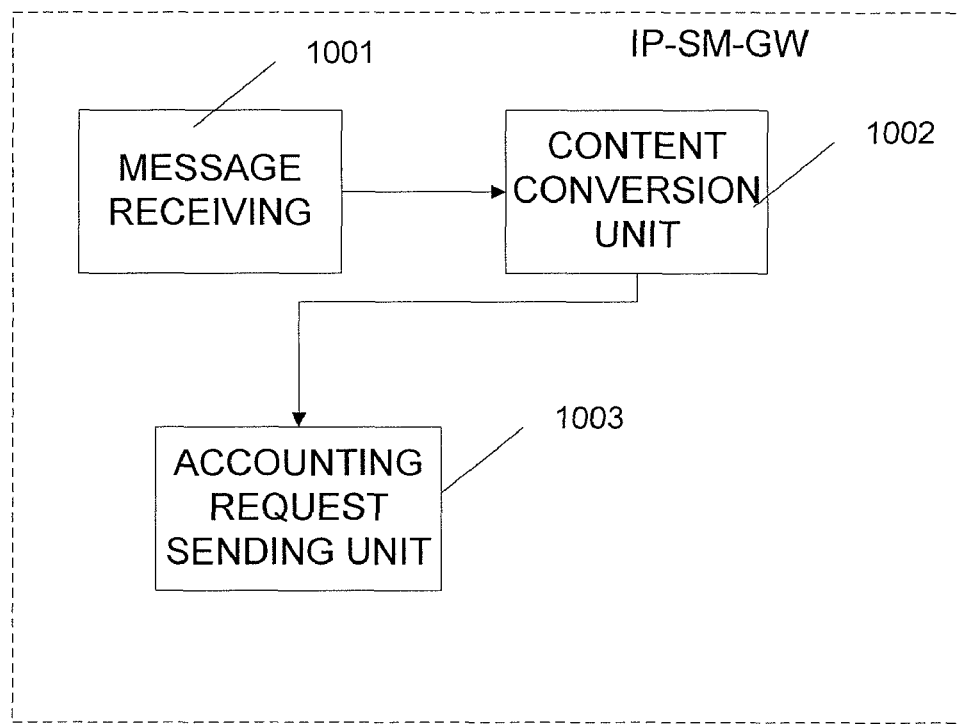
FIG. 10 is an exemplary diagram of a short message converting gateway according to one embodiment of the present disclosure.

FIG. 10 is a block diagram of IP-SM-GW according to one embodiment of the present disclosure. The IP-SM-GW may correspond to the message converting gateway of the present disclosure.

As illustrated in FIG. 10, the IP-SM-GW includes a message receiving unit 1001, a content conversion unit 1002 and an accounting request sending unit 1003.

The message receiving unit 1001 is configured to receive a message transmission request which carries message content to be transmitted to a receiver.

The content conversion unit 1002 is configured to convert the message content and generate a message conversion charging ID based on the message transmission request.

The accounting request sending unit 1003 is configured to send charging information carrying message conversion charging ID to the charging system.

In the above three embodiments, AVP of the short message's SMS-Information is listed below as shown in Table 1.

TABLE 1

| Field | Type | Description |
|---|---|---|
| Service Information | Om | This is a structured field. This field stores parameters such as specified by 3GPP in the definition of TS 32.299, which are responsible for SMS accounting. Both SMS-Information and PS-Information can use it. |
| SMS Information | Om | This is a structured field and stores parameters specified by SMS. |
| Message-Length | Om | This field stores the length of the short message. |
| Split-SMS-Number | Oc | This field stores the number of the converted short messages. |
| SMS-Application-Id | Oc | indicate that several converted short messages belong to the same service application |
| Sip-Session-Id | Oc | indicate that several short messages are converted from the message content of the same SIP message |

TABLE 1-continued

| Field | Type | Description |
| --- | --- | --- |
| PS Information | Oc | This is a structured field. The following parameters are assigned to SMS. The complete structure is defined in TS 32.251. |
| 3GPP user location information | Oc | This field stores user location information during SMS interaction. |
| 3GPP RAT type | Oc | This field stores 3GPP RAT type during SMS interaction. |
| PDP address | Oc | This field stores IP address of the user during SMS interaction, including the situation that the SMS node is IP-SM-GW. |

The foregoing is merely preferred embodiments of the present disclosure and is not intended to be limiting to the scope of the present disclosure. Any modifications, equivalents, improvements made within the spirit and principle of the present disclosure shall be construed as falling within the scope of the present disclosure.

What is claimed is:

1. A charging method, comprising:
   receiving, by a message converting gateway, a message transmission request from a message sender, wherein the message transmission request carries message content to be transmitted;
   extracting, by the message converting gateway, the message content in the message transmission request;
   converting, by the message converting gateway, the message content into multiple messages in accordance with operator's policy, restrictions on a short message protocol or restrictions on network bearer capability
   generating, by the message converting gateway, a message conversion charging ID; and
   sending, by the message converting gateway, charging information carrying the message conversion charging ID to a charging system for performing charging control on the multiple messages based on the message conversion charging ID;
   wherein the message conversion charging ID comprises at least one of the group consisting of:
   length of a complete message indicating the length of the message content extracted from the message transmission request;
   the number of the multiple messages, indicating the quantity of the multiple messages converted from the message content;
   a service application charging ID, indicating that a plurality of the multiple messages belong to a same service application; and
   a message session charging ID, indicating that a plurality of the multiple messages is converted from the same message content.

2. The method of claim 1, wherein performing charging control on the multiple messages based on the message conversion charging ID comprises:
   performing unified association charging on the multiple messages, after all the converted messages are transmitted, based on at least one of group consisting of the service application charging ID and the message session charging ID.

3. The method of claim 1, wherein performing charging control on the multiple messages based on the message conversion charging ID comprises:
   performing association charging on each of the multiple messages, after each of the multiple messages is transmitted, based on at least one of the group consisting of: the length of the complete message, the number of converted messages, the service application charging ID and the message session charging ID.

4. The method of claim 1, wherein sending charging information carrying the message conversion charging ID comprises:
   sending N times the charging information carrying the message conversion charging ID based on the number N of the multiple messages converted from the message content.

5. The method of claim 1, further comprising:
   forwarding the multiple messages converted from the message content.

6. The method of claim 1, wherein the charging information is from one of the group consisting of: an online accounting request or an offline accounting request.

7. The method of claim 1, wherein the message transmission request is a Session Initiation Protocol message.

8. A charging system, comprising:
   receiver, configured to receive charging information from a message converting gateway, wherein the charging information is used to charge for messages sent by a message sender, wherein the charging information carries a message conversion charging ID generated from the conversion of message content to be transmitted and the message content is converted into multiple messages in accordance with operator's policy, restrictions on a short message protocol or restrictions on network bearer capability; and
   a processor, configured to perform charging on the multiple messages based on the message conversion charging ID;
   wherein the message conversion charging ID comprises at least one of the group consisting of:
   length of a complete message indicating the length of the message content extracted from the message transmission request;
   the number of the multiple messages, indicating the quantity of the multiple messages converted from the message content;
   a service application charging ID, indicating that a plurality of the multiple messages belong to a same service application; and
   a message session charging ID indicating that a plurality of the multiple messages is converted from the same message content.

9. A message converting gateway, comprising:
   a message receiving unit, configured to receive a message transmission request which carries message content to be transmitted;
   a content conversion unit, configured to extracting the message content in the message transmission request, convert the message content into multiple messages in accordance with operator's policy, restrictions on a short message protocol or restrictions on network bearer capability, and generate a message conversion charging ID; and
   an accounting request sending unit, configured to send charging information carrying the message conversion charging ID to a charging system for performing charging control on the multiple messages based on the message conversion charging ID;
   wherein the message conversion char in ID comprises at least one of the group consisting of:
   length of a complete message, indicating the length of the message content extracted from the message transmission request;

the number of the multiple messages, indicating the quantity of the multiple messages converted from the message content;

a service application charging ID, indicating that a plurality of the multiple messages belong to a same service application; and a message session charging ID, indicating that a plurality of the multiple messages is converted from the same message content.

* * * * *

UNITED STATES PATENT AND TRADEMARK OFFICE
CERTIFICATE OF CORRECTION

PATENT NO. : 8,285,252 B2  
APPLICATION NO. : 12/632688  
DATED : October 9, 2012  
INVENTOR(S) : Li et al.

Page 1 of 1

It is certified that error appears in the above-identified patent and that said Letters Patent is hereby corrected as shown below:

On the Title Page:

Item (75) Inventor: The city/country of residence for inventor Li should read -- Shenzhen (CN) --.

Item (75) Inventor: The city/country of residence for inventor Shan should read -- Shenzhen (CN) --.

In the Claims:

Column 11, in Claim 1, line 32, "capability" should read -- capability; --.

Column 12, in Claim 9, line 63, "char in" should read -- charging --.

Signed and Sealed this  
Fifth Day of March, 2013

Teresa Stanek Rea  
*Acting Director of the United States Patent and Trademark Office*